Dec. 1, 1953  J. A. DREYFUS  2,661,412
ELECTROMECHANICAL RELAY
Filed Nov. 10, 1948  4 Sheets-Sheet 1

Inventor
Jean Albert Dreyfus
By Richards & Geier
Attorneys

Dec. 1, 1953  J. A. DREYFUS  2,661,412
ELECTROMECHANICAL RELAY
Filed Nov. 10, 1948  4 Sheets-Sheet 2

Inventor
Jean Albert Dreyfus
By Richard Geier
Attorneys

Dec. 1, 1953     J. A. DREYFUS     2,661,412
ELECTROMECHANICAL RELAY
Filed Nov. 10, 1948     4 Sheets-Sheet 3
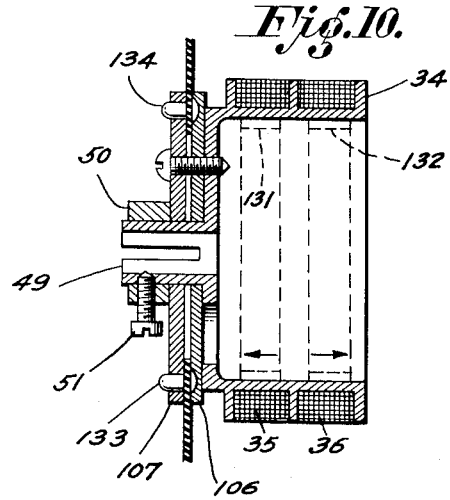
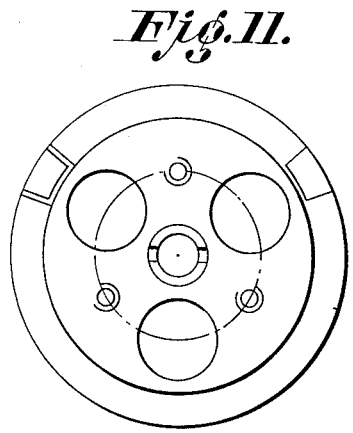
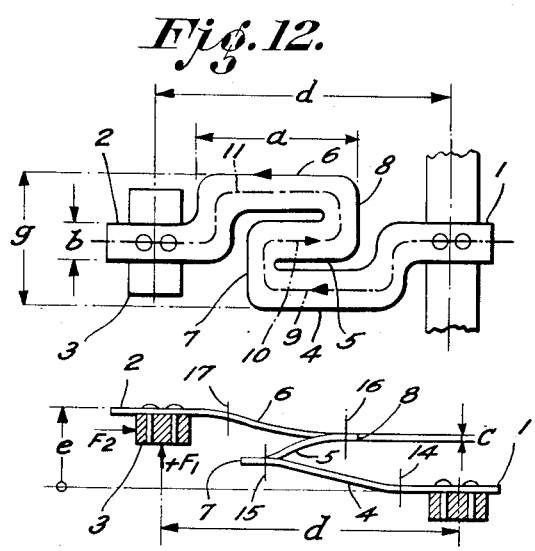
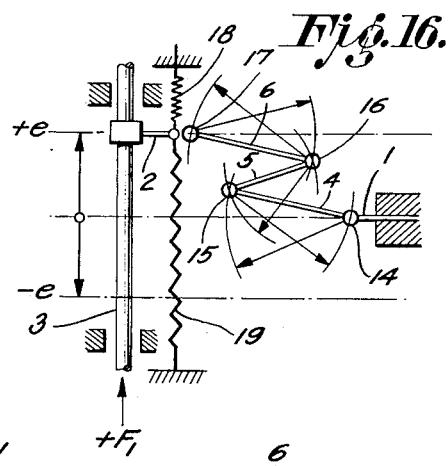
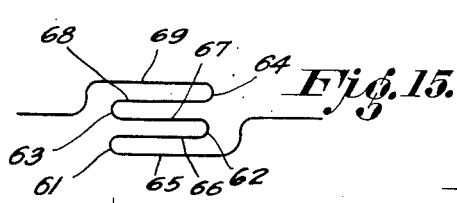
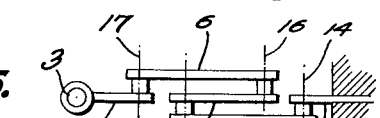
Inventor
Jean Albert Dreyfus
By Richard Geier
Attorneys Dec. 1, 1953    J. A. DREYFUS    2,661,412
ELECTROMECHANICAL RELAY
Filed Nov. 10, 1948                              4 Sheets-Sheet 4
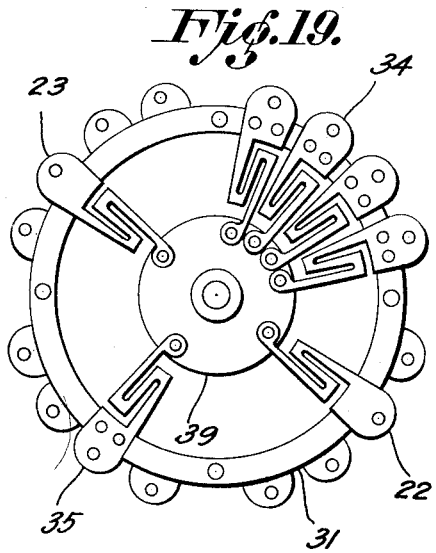
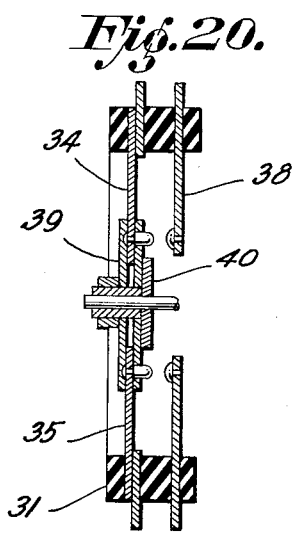
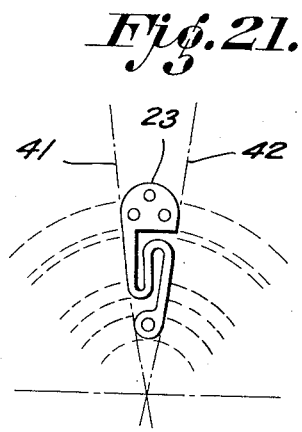
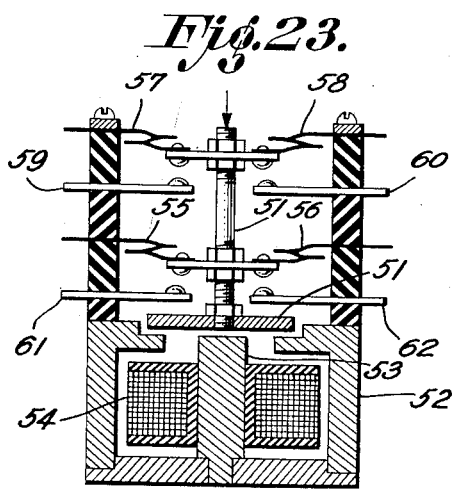
Inventor
Jean Albert Dreyfus
By Richard G. Geier
Attorneys Patented Dec. 1, 1953

2,661,412

UNITED STATES PATENT OFFICE 2,661,412

ELECTROMECHANICAL RELAY

Jean Albert Dreyfus, Geneva, Switzerland

Application November 10, 1948, Serial No. 59,361

5 Claims. (Cl. 200—110)

Known electro-mechanical relays generally comprise a movable armature which is suspended by a device such as a pivot and which executes a rotary movement under action of magnetic fields. The field is produced by an operating electric current. By its movement the movable armature opens or closes one or more contacts of controlled electric circuits.

According to the present invention the movable armature is suspended by means of a plurality of parallel lamellar springs arranged radially around the centre of the armature. Thus, in place of rotary movements the armature carries out parallel (translatory) movements under the action of the magnetic fields. The mounting is free from external friction or play. The opposing force produced by the lamellar springs can be strictly proportional to the longitudinal displacement of the armature. The neutral position of the movable armature can remain exactly constant. The arrangement according to the invention can improve known electro-mechanical relays which comprise a movable ferro-magnetic armature which moves under the action of electric fields generated by a fixed coil. These relays are known in telephone or telegraphic systems, for bells, vibrators, electric-mechanical rectifiers and for other purposes. Further, the arrangement according to the invention also permits the construction of completely novel electro-dynamic relays comprising a movable coil which is traversed by the operating current and which is suspended in the air gap of a fixed electro-magnet or permanent magnet.

By way of example Figures 1 to 23 illustrate some arrangements according to the invention.

Figures 10 and 11 show in section and in plan a movable armature which comprises a coil and which is applicable to all the relays described;

Figures 12 and 13 show in plan and in section a flexible electrical conductor which is formed with two bent lamellae and which constitutes an improved suspension arrangement;

Figures 14 and 15 are schematical axial views of such conductors;

Figures 16 and 17 illustrate diagrammatically the mechanical operation;

Figure 18 shows diagrammatically the force as a function of the displacement;

Figures 19 to 22 are plan and sectional views of parts of a relay having the improved arrangement illustrated in Figures 12 to 18;

Figure 23 is a section through an electro-magnetic relay provided with suspension springs like those of Figures 12 to 18.

Figure 1:
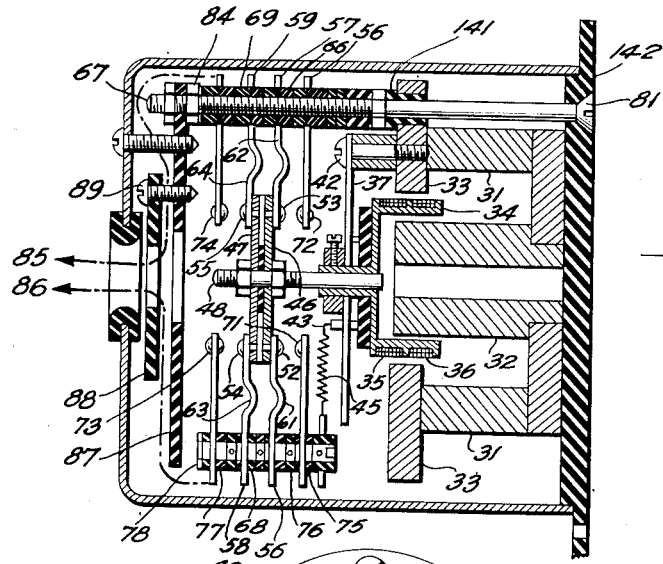
Figure 1 is a section through a relay having a movable armature which is suspended by springs having the form of bent lamellae.
Figure 2:
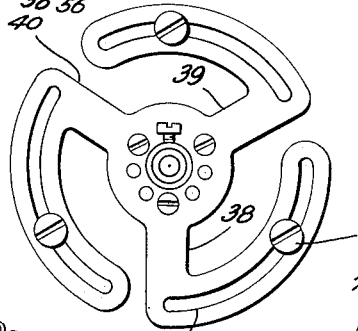
Figure 2 is a view of the suspension springs of Figure 1.
Figure 3:
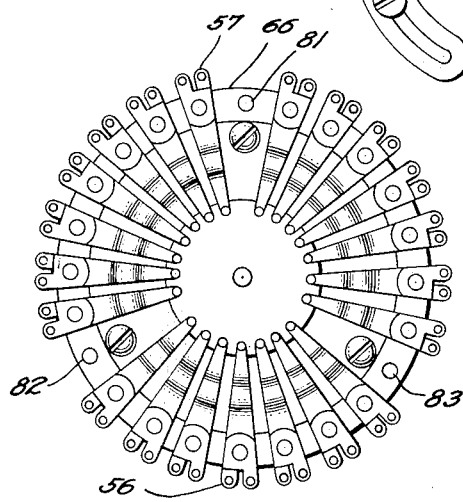
Figures 3 and 4 are detail views of parts of Figure 1.
Figure 4:
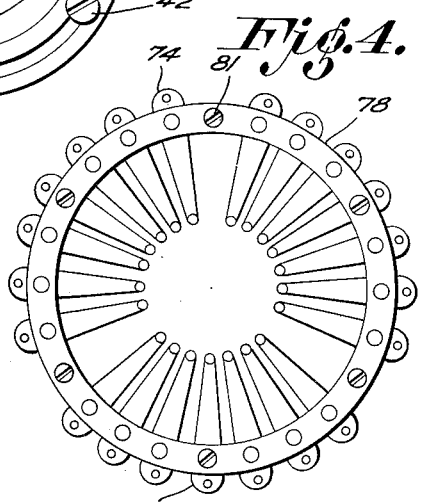

According to Figure 1, the permanent magnet 31 produces a uniform magnetic field in the annular air gap provided between the cylindrical core 32 and the pole ring 33. The movable coil comprises a cylindrical body 34 which is formed with two grooves in which are located two windings 35 and 36. Details of construction are shown to a larger scale in Figures 10 and 11. The coil is suspended by a group of at least two spring strips 38 to 40 which may be made of bronze and which are arranged radially, symmetrically and in arcs of a circle. Each strip can be formed with a circular slot 41 in which a screw 42 is slidably mounted, this permitting the adjustment of the resilient force of the springs. The ends of the windings 35 and 36 are soldered to split terminals such as 43 which are connected to external terminals by means of flexible conductors 45. The displacements of the movable coil are transmitted to insulating discs 46 and 47 by means of the shaft 48 which is held in the coil by the split sleeve 49, the ring 50 and the screw 51. The discs 46 and 47 carry movable contacts such as 52 to 55 which are connected to external terminals 56 to 59 by means of at least two radially and symmetrically arranged bent metallic strips such as 61 to 64 (Figure 1). The terminals 56 to 59 are gripped between pairs of insulating rings such as 66, 67 and 68, 69. When the movable coil is traversed by an operating current the movable contacts 52 to 55 come against the spring contacts such as 71 to 74 of the controlled circuits (Figure 4). These springs are clamped between insulating rings such as 75 to 78. All the insulating rings can be assembled one on the other with the aid of three insulating screws 81 to 83 and clamped together by nuts such as 84. The ends of the flexible leads and of the springs are connected to axially external cables such as 85 and 86 which are clamped between the discs 87 and 88 by screws such as 89. A movable cover protects the relay.

Figure 5:
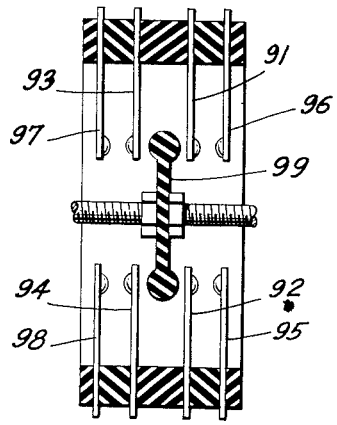
Figure 5 shows a modification of the arrangement according to Figures 1 to 4.

In the arrangement according to Figure 5, movable contacts can be riveted on leaf springs such as 91 to 94 and they are adapted to engage spring contacts 95, 96, or 97, 98 when the operating rod 99 is displaced by the movable coil.

Figure 6:
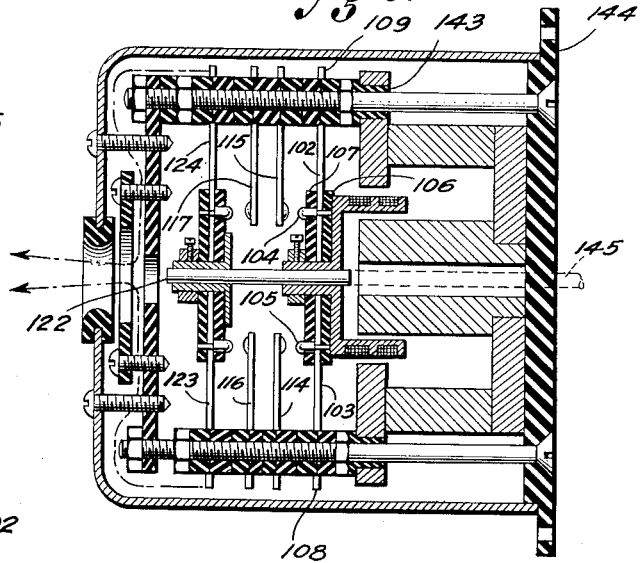
Figure 6 is a section through a relay comprising a movable armature the suspension springs of which constitute electrical conductors.
Figures 7, 8:
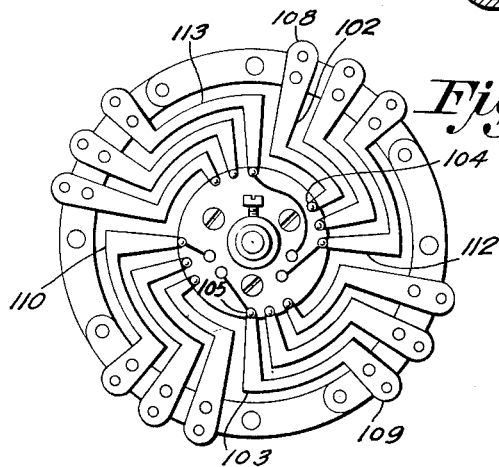
Figures 7 and 8 are detail views of parts of the relays of Figure 6.
Figure 9:
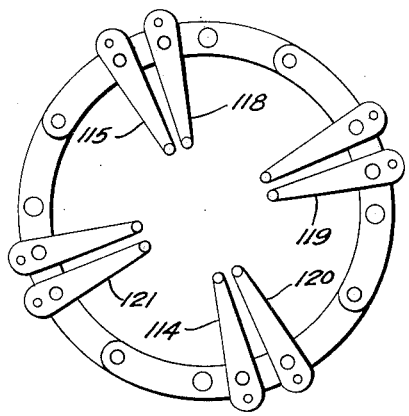
Figure 9 shows a modification of a part of the relay of Figure 7.

In the arrangement according to Figures 6 to 8 and also according to Figure 9, the suspension springs of the movable coil are constituted by bent metallic strips such as 102 and 103 which connect electrically the movable contacts such as 104 and 105, which are gripped between insulating discs 106 and 107, to external terminals such as 108 and 109. Parts of these strips such as 110, 112 and 113 can serve to supply the movable coil, thus economising in the use of special flexible conductors while providing an improved form of construction. The movable contacts are adapted to engage against radial spring contacts such as 114 to 121. The movable shaft 122 can be supported by two spring arrangements, one of which including bronze strips such as 102 and 103 is elastic while the other, which includes strips such as 123 and 124 of annealed copper, aluminium or other soft metal, provides supplementary damping.

The bent strips can have shapes such as those shown at 125 in Figure 9.

The insulating members, such as the ring 141 and the discs 142 and 87 in Figure 1 or the ring 143 and the disc 144 in Figure 6, electrically insulate the armature such as 32 and 33 and the magnet such as 31 from the earth. Thus, the windings of the movable coil such as 35, 36 could be energised by a current derived from a high tension supply such as an anode supply without risk of electrical discharge in the gap. The armatures could be isolated in the air or they could be brought to the mean potential of the movable coil.

In the arrangement according to Figure 10 the body of the coil 34 could be formed from a cylinder of non-magnetic metal such as brass or aluminium. By a suitable choice of the electrical conductivity of the metal and the thickness of the walls it is possible to obtain any desired damping of the movable assembly by the action of the induced currents. Moreover, the metal cools the windings so that the permissible current density is many times greater than in the case of coils having bodies made of insulating material.

To obtain a relay which makes impulsive oscillations two symmetrical permanent magnets such as the rings 131 and 132 are introduced into the body of the coil. Each time that the windings receive an impulse in the reverse direction the movable armature passes its position of equilibrium and permanently closes a set of opposing contacts.

The two symmetrical windings such as 35 and 36 could be connected in series, in parallel or in push-pull. They can be of high or low resistance varying between a few ohms and some thousands of ohms according to the characteristics of the controlling circuit.

A numerical example of an electro-dynamic relay which is shown in full scale in Figures 1 to 9:

Weight of magnet_____ 150 grammes.
Weight of armatures_____ 150 grammes.
Weight of the movable assembly. 5 grammes.
Width of gap_____ 1.5 mm.
Magnetic field_____ 8,000 gauss (when an Alnico type magnet is used).
Diameter of the movable coil. 20 mm.
Diameter of the wire_____ 0.05 mm. enamelled.
Number of turns_____ 2×1.000=2.000.
Resistance _____ 2×.700=1.400 ohms.
Inductance _____ 0.05 henry.
Current _____ 0.05 ampere.
Number of ampere turns____ 2×50=100.
Axial force of the coil___ F = 8.000 (gauss) × 3.14 × 2 (cm.) × 2.000 (turns) × 0.05 (ampere) × 0.1 (C. G. S.) = 500,000 dynes = 450 grammes.
Voltage _____ 70 volts.
Power _____ 0.05 (ampere) × 70 (volts) = 3.5 watts.
  For 20 contact springs per section, force per contact, 20 grammes.
  Opposing force of the diaphragm 50 grammes for displacement of 0.5 mm.
Time _____ 1 millisec.
Thickness of the conducting strips (123, 124, 116 and 117 of Figure 6) forming the diaphragms (bronze or brass). 0.07 mm.
Total number of contacts___ 4×20=80.

The above arrangement permits of the energising of two coil windings and the polarised operation of thirty-six independent circuits.

It is possible to utilise condensers to obtain the selective operation according to frequency or impulses. A second symmetrical relay could be connected with the shaft 145 (Figure 6) passing through an opening in the coil to obtain a push-pull magneto-mechanical arrangement.

In order that different types of relay may be mounted with the aid of standard interchangeable elements the clamping rings such as 104 and 105 of Figure 6 can be made of moulded material having recesses and holes to receive projections stamped in the strips such as 125 of Figure 9. Similarly, the insulating disc such as 107 (Figures 6 and 10) can be formed with holes in which the contacts such as 133 can fit and from which they can project. In these conditions only the silver contacts such as 133 and 134 are riveted to their strips, while the strips themselves can be fitted or removed simply by unscrewing the rings such as 131 and 132 or 104 and 105. Thus it is possible to fit $n \div 2$ strips in each pair of rings, the strips being arranged evenly in the form of a star, whereby $n=1, 2, 3, 4. \ldots$ In the case of vibratory or oscillatory electrodynamic relays it is an advantage to avoid the damping caused by the annular metal body of the coil while maintaining the cooling properties of the metal. In this case an axial slot is cut in the cylinder of the body of the coil underneath the windings.

By varying the length of the slot or by cutting a number of axial holes it is possible to vary as desired the damping co-efficient of the body of the coil. For the same purpose it is also possible to vary the thickness of the cylinder wall.

To utilise the relay as a transformer or vibrator to convert a direct current into an alternating current, whether single phase or polyphase, the controlling and controlled circuits are connected in series, one or more rest contacts being provided which are adapted to close in a phase displacing manner. With the aid of electrical condensers it is possible to synchronise the mechanical resonance with the electrical resonance. The group of bent strips of Figure 2, the strength of which is adjustable, enables the mechanical resonance to be adjusted. Such vibratory relays can also be utilised as motors of clocks or the like or as bells or the like.

The relay according to the invention with its standard interchangeable elements is capable of the most varied uses. It can advantageously be used to replace the known electromagnetic relays in telephony and in tele-controlled systems and also the impulse relays of selectors, controllers, rocking relays, permanent relays whether having a delayed or instantaneous action and polarised relays for high speed telegraphy. Furthermore, when the relay is connected to provide self maintained oscillations it can serve to generate musical frequencies, as an accurate clock motor, as a vibrator, as a rectifier, as a warning signal or for other purposes.

The supporting conductors described can be considerably improved when the axis of each conductor describes $2n$ half-loops connecting $2n+1$ straight segments which when at rest, are situated in a plane which is approximately normal to the direction of movement of the movable armature, where $n$ is a whole number, such as 1, 2, 3 etc. This conductor provides 2 $(2n+1)$ parallel pivotal axes which are free from play and from external friction and it produces a restoring force which is proportional to the displacement of the armature over wide limits.

According to Figures 12 to 14 the spring strip, which may be made of bronze, aluminium or of another metal, comprises a fixed end 1 secured to a fixed insulator and a movable end 2 attached to an insulator 3 which carries out translatory movements under the effect of the force $F_1$. The mean longitudinal axis of the spring conductor comprises three straight segments 4 to 6 and two half loops 7 and 8 which are in opposite directions. The ends are connected by four quarter loops which cancel out the lateral staggering. The electric current flows through the conductor in the direction of the parallel arrows 9 and 11 and of the oppositely-directed arrow 10. The self-induction of this double loop conductor is much less than that of a coiled conductor, this being particularly advantageous with high amperage currents or with high frequencies.

The width $b$ of the conductor is at least ten times greater than its thickness $c$. The total width $g$ is much less than the distance $d$ between the two ends. Thus, the conductor is resiliently flexible when it is acted upon by a force $F_1$ normal to its axial plane while it resists any other force, such as $F_2$, situated in this plane.

The mechanical operation of the conductor is represented by the two plan views of Figures 16 and 17. Everything acts as if the conductor comprised five rigid rods 1 and 2 and 4 to 6 connected by six pivotal connections which are free from play and which correspond to four pivots 14 to 17 having parallel axes. The movable end is thus acted upon by two incorporated opposing springs 18 and 19. Thus, when the insulator 3 is acted upon by a force $+F_1$ the conductor introduces an opposing force $-F_1$ which, within wide limits, is strictly proportional to the elongation caused by the movement of the movable end, as is shown in the diagram of Figure 18.

To increase the number of contacts of an electro-dynamic relay, while improving the mounting of the movable coil, it is possible, according to Figures 19 to 22, to provide a certain number, such as 3, 4, 6, 8, 12, 24 or more, conductors, such as 222, 223, 234, 235, arranged in the form of a star. Their movable ends are clamped between insulating discs 239 and 240, while their fixed ends are riveted to an insulating ring 231. The contacts of the movable conductors are adapted to engage the springs 236 to 239 when the movable coil is influenced by a predetermined change in the current through it.

According to Figure 21 a conductor such as 223 to 234 is contained within a surface which is limited by a sector of a circle with radii 241 and 242. The straight sections of the longitudinal axis of the conductor are arranged radially. Thus it is possible to provide a great number of conductors in the form of a star so as to make the best use of the space available. It is also possible to arrange a plurality of star-like assemblies of conductors in the manner of the spokes of a bicycle wheel in order to increase the number of contacts.

The movable coil can be replaced by a ring of a magnetic metal, such as soft iron, steel or a magnet and the permanent magnet can be replaced by an electro-magnet the winding of which is traversed by the varying current.

Two or more star assemblies of conductors according to the invention may be arranged, when at rest, in parallel planes.

Thus, Figure 23 shows an electro-magnetic relay comprising a movable armature 251 which is mounted in the gap formed between the fixed armatures 252 and 253 and in which the magnetic field is produced by the fixed coil 254.

The suspension, the centering and the guiding of the movable armature are effected by conductors such as 255 to 258 which are disposed in the form of a star and which are similar to the conductors 222. The contacts of these conductors are adapted to engage against spring contacts such as 259 to 262.

By way of another example Figure 15 shows the longitudinal axis of a supporting conductor which includes four half-loops 161 to 164 and five straight sections 165 to 169. The number of internal pivotal axes is then 10.

I claim:

1. An electro-mechanical relay, comprising in combination, means for producing a magnetic field, an armature adapted to be located within said field and having a carrier, a winding carried by said carrier, contacts and means connecting said contacts with said carrier, a plurality of thin resilient metallic strips located in one plane transverse to the armature, and extending radially in relation to said armature, an outer support, said strips having inner ends connected to said contacts and outer ends connected to said outer support, each of said strips having at least two bent portions and at least three straight portions joining said bent portions, all of said portions being in the plane of the strip, whereby said armature is suspended by said strips and is moved transversely thereto by electromagnetic forces, resilient radial strips connected with said contacts, other contacts spaced in relation to first-mentioned contacts and engaged thereby when said armature is moved, and radially disposed resilient elements carrying said other contacts.

2. An electro-mechanical relay, comprising in combination, means for producing a magnetic field, an armature adapted to be located within said field and having a carrier, a winding carried by said carrier, contacts and means connecting said contacts with said carrier, a plurality of thin resilient metallic strips located in one plane transverse to the armature, and extending radially in relation to said armature, insulating rings, said strips having inner ends connected to said contacts and outer ends held between said rings, other thin resilient metallic strips located in one plane transverse to the armature and extending radially in relation to the armature, an outer support, said other strip having inner ends connected to said carrier and outer ends connected to said outer support, each of said other strips having at least one substantially rectangularly bent portion located in the plane of the strip, whereby said armature is suspended by said strips and is moved transversely thereto by electromagnetic forces, and other contacts spaced in relation to first-mentioned contacts and engaged thereby when said armature is moved.

3. An electro-mechanical relay, comprising in combination, means for producing a magnetic field, an armature adapted to be located within said field and having a ring consisting of non-magnetic metal, at least one coil of insulated metallic wire wound around said ring, contacts, and means connecting said contacts with said ring, a plurality of thin resilient metallic strips located in one plane transverse to the armature, and extending radially in relation to said armature, an outer support, said strips having inner ends connected to said ring and outer ends connected to said outer support, each of said strips having at least one substantially rectangularly bent portion located in the plane of the strip, whereby said armature is suspended by said strips and is moved transversely thereto by electromagnetic forces, resilient radial strips connected with said contacts, other contacts spaced in relation to first-mentioned contacts and engaged thereby when said armature is moved, and radially disposed resilient elements carrying said other contacts.

4. An electro-mechanical relay, comprising in combination, means for producing a magnetic field, an armature adapted to be located within said field and having a winding, a substantially cup-shaped casing carrying said winding, insulated rings connected with said casing, and contacting means connected with said casing, a plurality of thin resilient metallic strips located in one plane transverse to the armature, and extending radially in relation to said armature, an outer support, said strips having inner ends gripped between said insulated rings and outer ends connected to said outer support, each of said strips having at least one substantially rectangularly bent portion located in the plane of the strip, whereby said armature is suspended by said strips and is moved transversely thereto by electromagnetic forces, and other contacts spaced in relation to the contacting means and engaged thereby when said armature is moved.

5. An electro-mechanical relay, comprising in combination, means for producing a magnetic field, an armature adapted to be located within said field and having a carrier, a winding carried by said carrier, two sets of contacts interconnected in series, and means connecting said contacts with said carrier, means including one set of contacts and constituting a controlling electrical circuit, means including another set of contacts and constituting a controlled electrical circuit, a plurality of thin resilient metallic strips located in one plane transverse to the armature, and extending radially in relation to said armature, an outer support, said strips having inner ends connected to said carrier and outer ends connected to said outer support, each of said strips having at least one substantially rectangularly bent portion located in the plane of the strip, whereby said armature is suspended by said strips and is oscillated transversely thereto by electromagnetic forces, and other contacts spaced in relation to first-mentioned contacts and engaged thereby when said armature is moved.

JEAN ALBERT DREYFUS.

References Cited in the file of this patent

UNITED STATES PATENTS

| Number | Name | Date |
|---|---|---|
| 903,745 | Pearson | Nov. 10, 1908 |
| 1,937,602 | Stewart | Dec. 5, 1933 |
| 1,955,248 | Messick | Apr. 17, 1934 |
| 1,961,286 | Engholm | June 5, 1934 |
| 2,004,735 | Thomas | June 11, 1935 |
| 2,007,749 | Anderson | July 9, 1935 |
| 2,014,621 | Jensen | Sept. 17, 1935 |
| 2,026,994 | Messick | Jan. 7, 1936 |
| 2,134,047 | Kalsey | Oct. 25, 1938 |
| 2,417,077 | Hoover | Mar. 11, 1947 |
| 2,500,190 | Lee | Mar. 14, 1950 |

FOREIGN PATENTS

| Number | Country | Date |
|---|---|---|
| 244,051 | Great Britain | July 8, 1926 |
| 359,092 | Great Britain | Oct. 22, 1931 |
| 366,843 | Great Britain | Feb. 11, 1932 |
| 387,127 | Great Britain | Feb. 2, 1933 |
| 548,055 | Great Britain | Sept. 23, 1942 |